United States Patent [19]
Kalavitis

[11] Patent Number: 6,151,878
[45] Date of Patent: Nov. 28, 2000

[54] FOLDING IMPLEMENT FOR A RAKE

[76] Inventor: Jack Kalavitis, 1154 8th Ave. N., Naples, Fla. 34102

[21] Appl. No.: 09/464,159

[22] Filed: Dec. 16, 1999

[51] Int. Cl.$^7$ ........................................................ A01D 7/00
[52] U.S. Cl. ....................................... 56/400.12; 56/400.04
[58] Field of Search ............................. 56/400.01, 400.04, 56/400.12, 400.07, 400.17, 400.18, 400.19

[56] References Cited

U.S. PATENT DOCUMENTS

| | | | |
|---|---|---|---|
| 2,504,943 | 4/1950 | Zifferer | 56/400.12 |
| 3,095,682 | 7/1963 | Pasquine | 56/400.12 |
| 3,601,966 | 8/1971 | Kerry | 56/400.12 |
| 4,185,448 | 1/1980 | Blanco | 56/400.12 |
| 4,378,671 | 4/1983 | Gascon | 56/400.12 |
| 4,545,189 | 10/1985 | Nelson | 56/400.12 |
| 5,303,536 | 4/1994 | Tolliver | 56/400.12 |
| 5,765,351 | 6/1998 | Frankhouser | 56/400.12 |

*Primary Examiner*—Robert E. Pezzuto

[57] ABSTRACT

A rake having a main rake and a supplemental rake thereon which is movable from a rest position to an open position where a load can be grasped to be deposited at a desired location. Both the main rake and the supplemental rake have tines with opposing points. When the supplemental rake is at a rest position, the above noted tines interleave with each other. The supplemental rake is hinged to the main rake and includes a pretensioned spring that is biased in such a manner so that the supplemental rake always tends to move into its rest position. When the supplemental rake is moved away from the main rake by an activation mechanism, the pretensioned spring is further tensioned and when a load is grasped between the two rakes the spring alone will keep the load there between without any further intervention by a worker. Additional mechanism has been provided which will extend the load capacity of the rake.

10 Claims, 5 Drawing Sheets

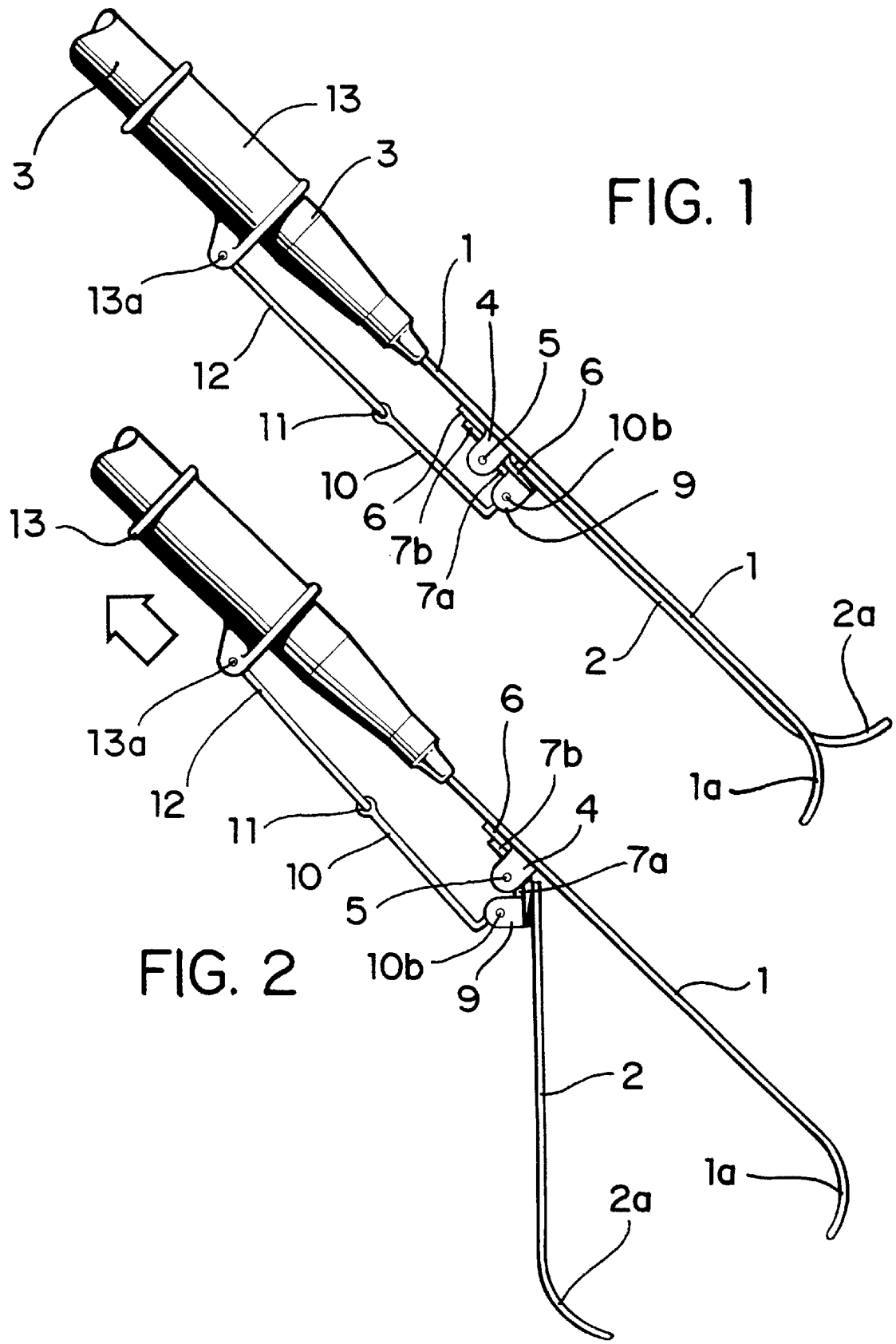

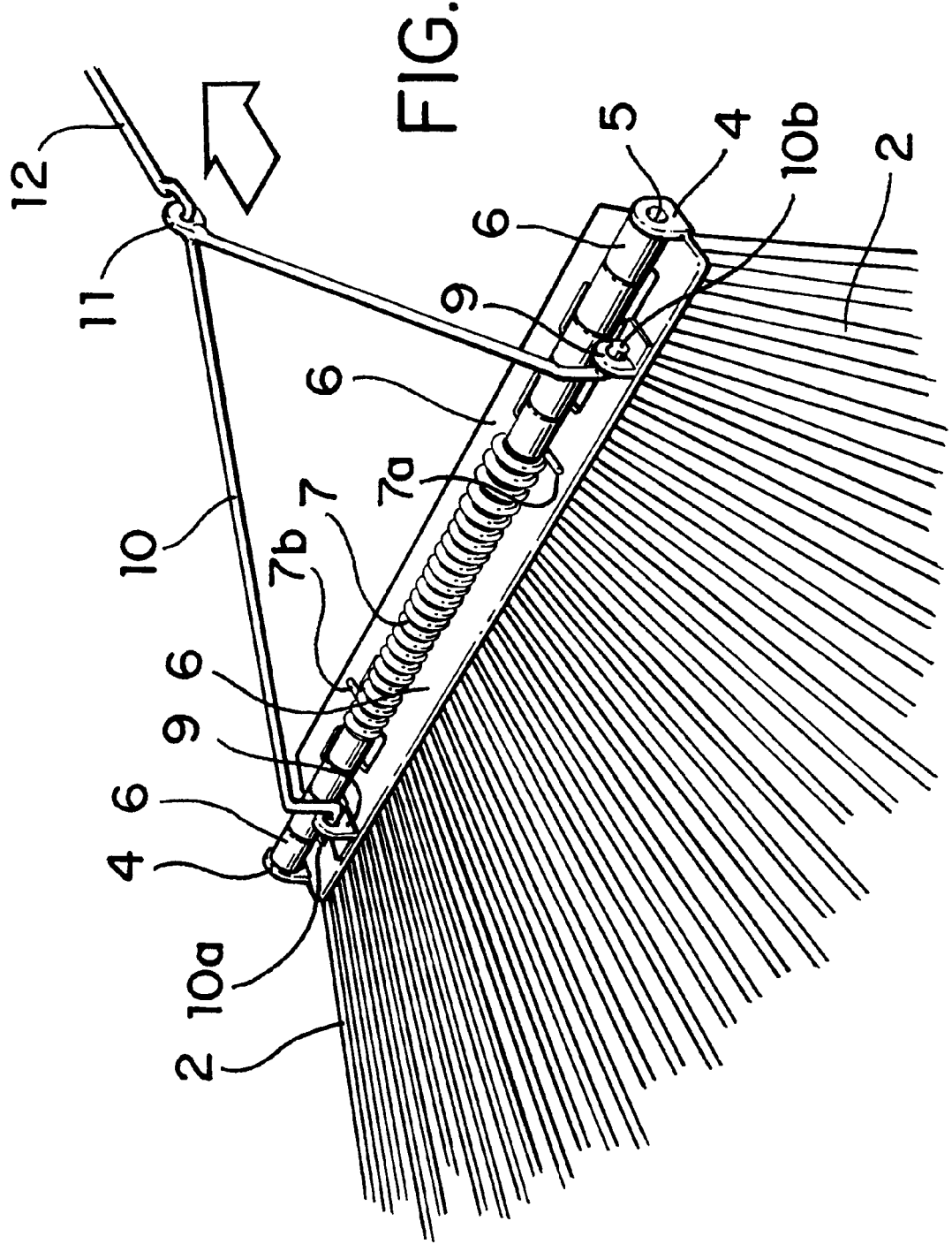

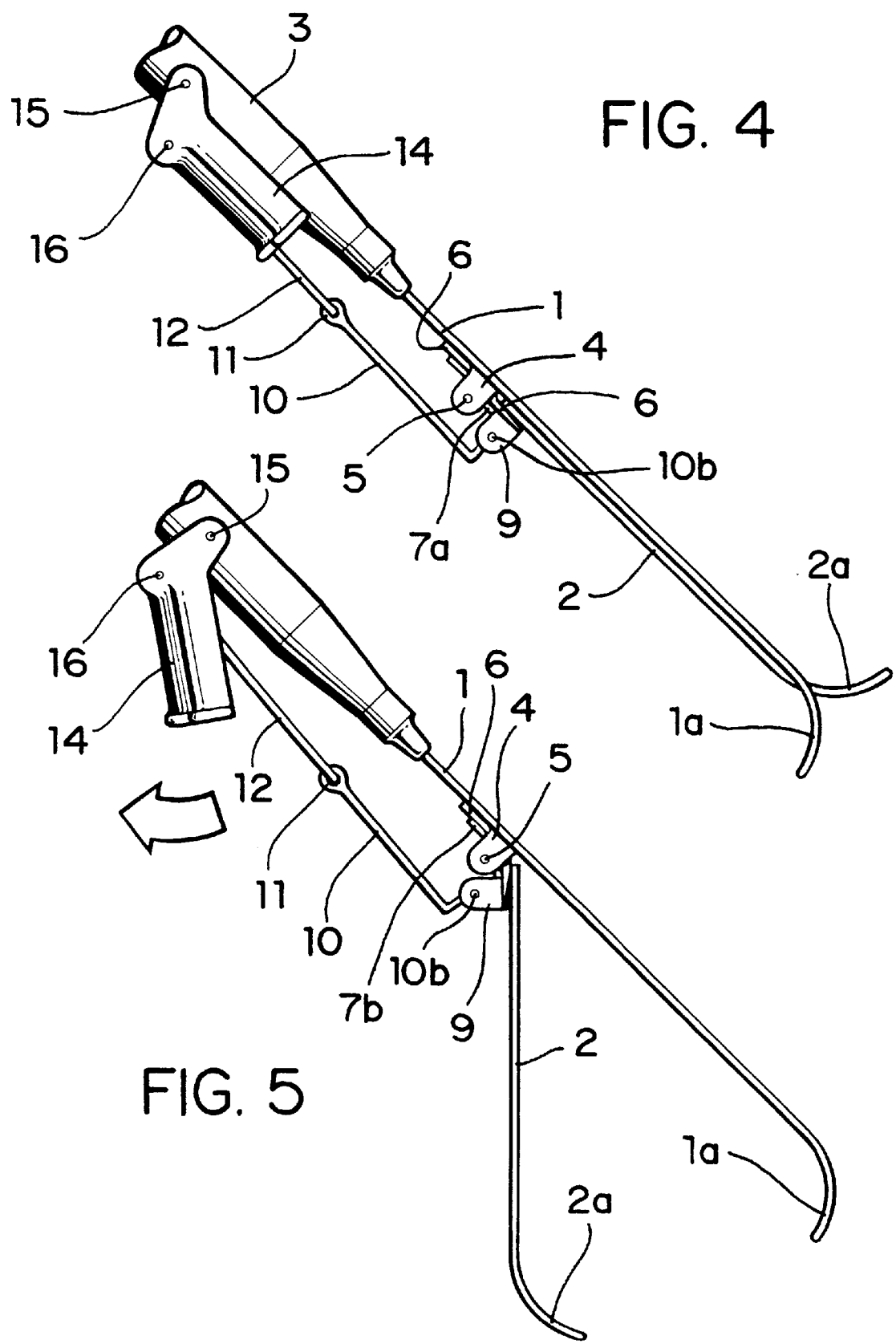

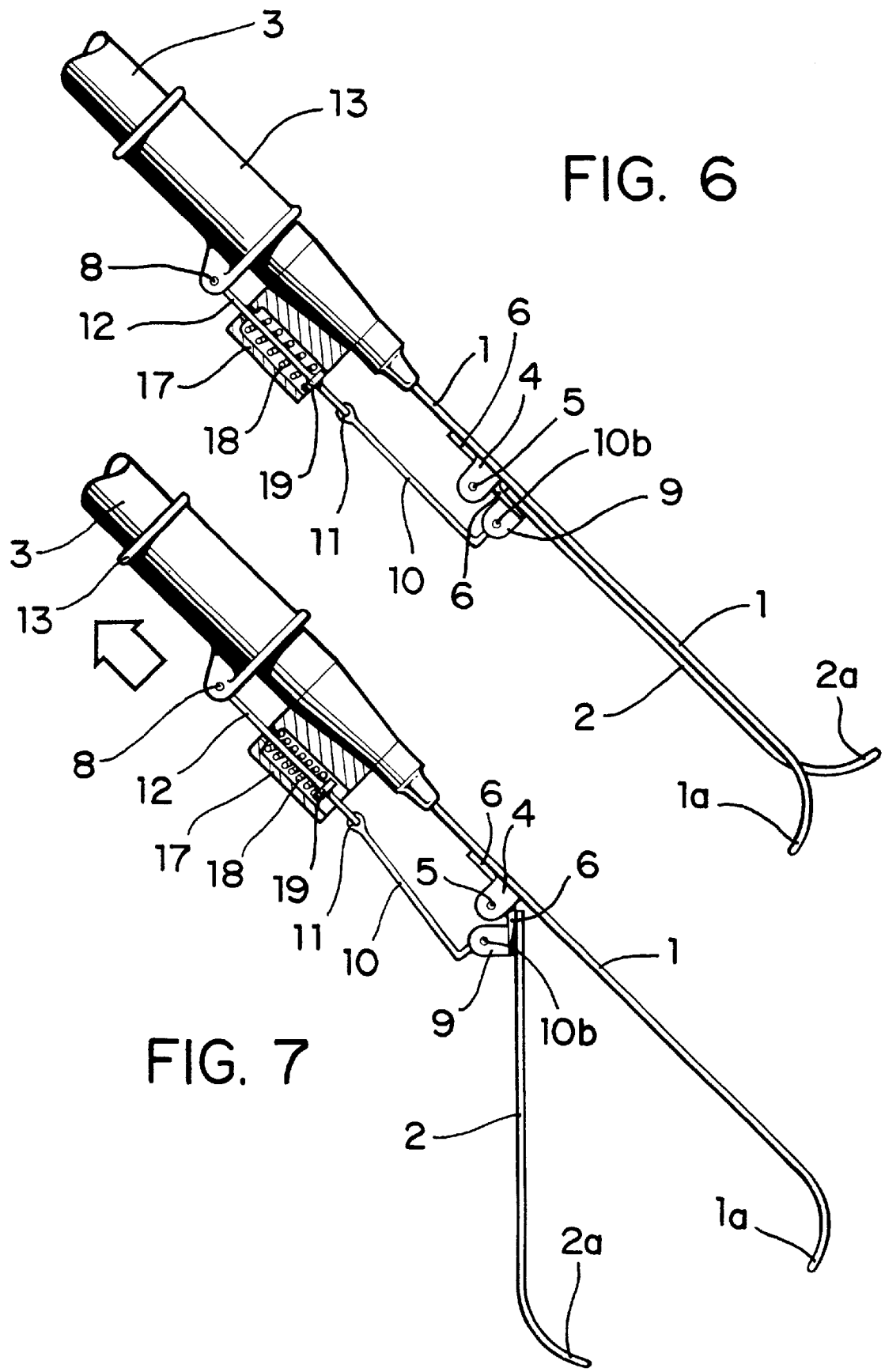

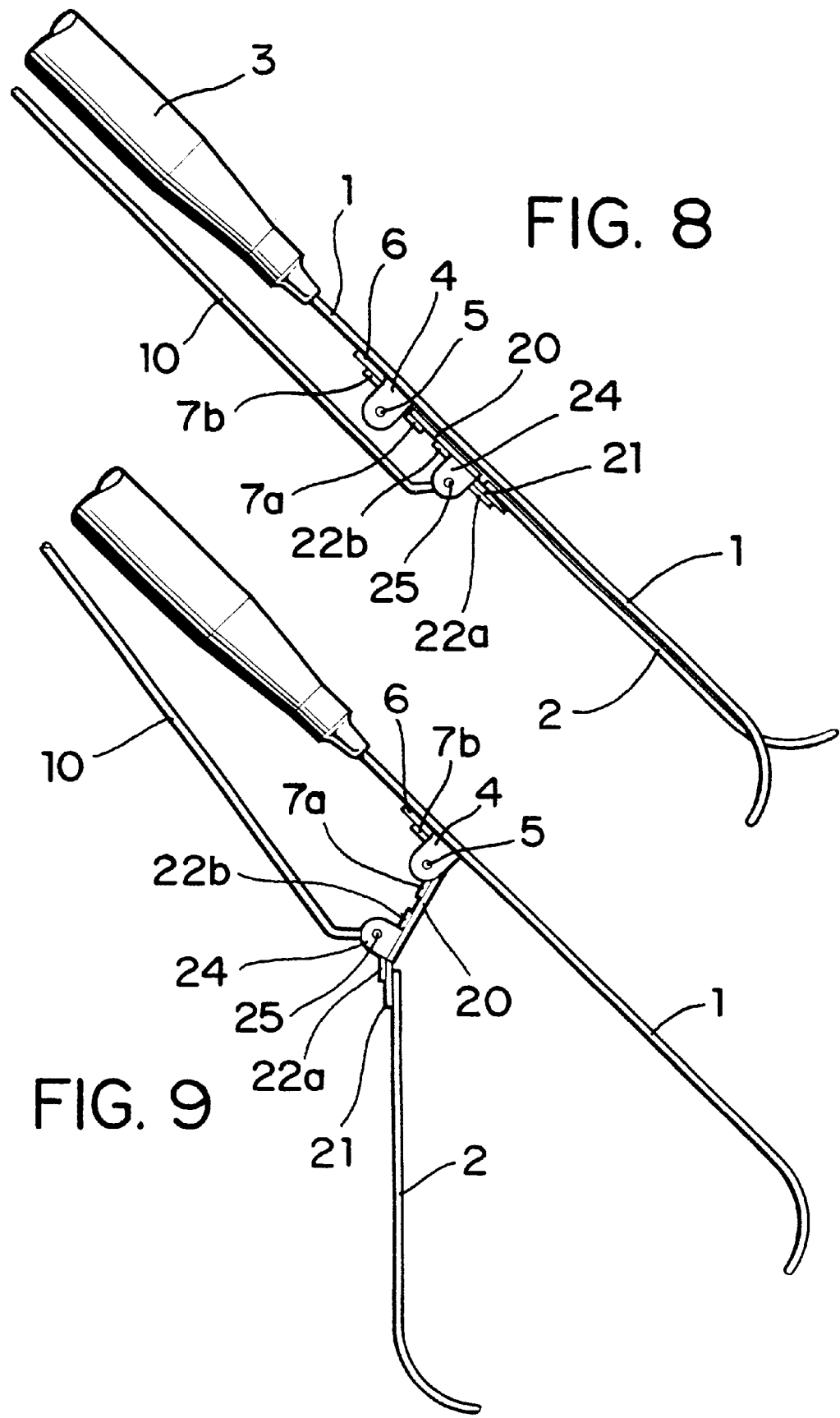

FOLDING IMPLEMENT FOR A RAKE

BACKGROUND OF THE INVENTION

The rake of the invention pertains to a working instrument having flexible tines which rake is mostly used for raking together fallen leaves, grass clippings or other debris that tends to collect on one's lawn. The tines of the rake are fixed in a row which may be arranged in a fan-shaped array or in a rectangular array. Which rake to use for any particular job depends entirely on the person using the rake. When raking leaves or other debris, the leaves are normally raked together into a pile of some sort and are than disposed of by the person grabbing the leaves against the rake tines to simulate a bundle and then to dispose of this gathered bundle into a barrel or into a large plastic bag. Every time when this task is done, the person doing the raking has to completely change his or her stance which is quite different from that while raking. With this folding implement being attached to the main rake, the raked-up pile can be disposed of in a much quicker and easier manner.

U.S. Pat. No. 5,414,982 shows such a rake but it is constructed quite differently from the invention at hand in that the main rake folds into half along the axis of the handle. Experience has shown that this rake, when folded in half diminishes the capacity of the load that can be handled at any one time. Also the construction is quite complicated.

U.S. Pat. No. 5,440,868 shows the basic construction as the rake of the patent above but the construction is somewhat simplified and fingers have been added to lateral sides of the tines in order to gain in the capacity of the rake. The rake still folds into half along an axis of the handle.

U.S. Pat. No. 4,018,038 shows a rake which basically consists of two rakes spaced from each other which are normally open when in a raking mode but are moved toward each other when in a load carrying mode.

U.S. Pat. No. 5,511,370 shows a rake with a multiple of tines wherein each of the tines has at least two prongs. This rake is not designed and constructed for handling any loads but to increase the raking efficiency of the rake.

U.S. Pat. No. 4,378,671 shows a rake which is constructed as a main rake and as an auxiliary head to be moved from a storage position to a position where the two rakes can grasp and carry a load there between. Both rakes operate independently of each other. This construction tends to increase the overall weight of the raking implement.

U.S. Pat. No. 4,545,189 shows a rake having a main rake head and an auxiliary rake which can be pivoted upwardly into storage position and then downwardly into a load grasping position. A pivotal link separates an upper portion of the two heads such that the capacity of the grasp is greater than that of conventional rakes with grasping devices. This is similar to the rake of the invention but the storage of the auxiliary rake is reversed such that when in a storage position, the tines of both rake heads interleaf which adds to the overall raking efficiency of the rake because of the presence of a multiple of tine tips contacting the ground while in the act of raking.

OBJECTS OF THE INVENTION

An object of the invention is to improve the raking efficiency of a rake. Another object is to use an auxiliary rake of the main rake which easily folds into a position relative to the main rake head to form a clamp of two rake heads to enable a user to grasp a load between the two rake heads to be able to easily dispose of the load. Another object is to construct a rake, is explained above, that does not involve the use of many moving parts, is sturdy and is reliant in its use and is simple to construct.

BRIEF DESCRIPTION OF THE DRAWINGS

FIG. 1 Shows the rake with the supplemental rake in a closed or normal position.

FIG. 2 Shows the rake of FIG. 1 in an open position

FIG. 3 Shows the details of the supplemental rake and how it is hinged

FIG. 4 Shows the same rake as in FIG. 1 in a closed position but having a different activation mechanism FIG. 5 Shows the rake of FIG. 4 in open position FIG. 6 Shows the rake of FIG. 1 in a closed position with a different spring mechanism FIG. 7 Shows the rake of FIG. 6 in an open position FIG. 8 Shows the rake of FIG. 1 with an increased capacity mechanism and in a closed position FIG. 9 Shows the rake of FIG. 8 in an open position.

DETAILED DESCRIPTION OF THE INVENTION

FIG. 1 illustrates the inventive rake in a closed position, that is, there is a main rake having tines with bent over points 1a which is well known in the art. However, a supplemental rake 2 has been attached to the main rake 1 having its tines 2 with bent over points 2a. The main rake 1 is attached to the handle 3 which is also well known in the art. In the position shown in FIG. 1, the main rake 1 and the supplemental rake 2 are interleaved and the supplemental rake is in storage. The bent over points 1a of the main rake are now in a working or raking position. It is believed and practice has shown that the interleaved tines of both rakes contribute to a more eficient raking of the rake because more tines are always available to do the work.

When it is desired to pick up a pile of leaves etc., the supplemental rake 2 is swung away from the main rake as is shown in FIGS. 2 and 3. For this purpose, the supplemental rake is mounted on a hinge plate 6 (FIG. 3) which is mounted on the main rake. On the main rake there is provided a hinge 6 (FIG. 3) having a hinge pin 5. This hinge can take the form of a piano hinge or any other suitable form. In order to open the supplemental rake, on one half of the hinge, brackets 9 have been placed having holes therein into which bent over ends 10a and 10b of a V-shaped wire harness are articulated. The wire harness at the end of the V has been provided with an eyelet 11 in to which a single wire or rod 12 has been inserted. The wire or rod 12 is articulated at 13a to a slidable push and/or pull handle 13 which slides on the handle 3. It is clear now that when the slidable handle 13 is pulled up on the handle 3, the wire 12 will pull on the eyelet 11 of the V-shaped wire harness 10 which in turn will pull on the brackets or flanges 9 into which the ends 10a and 10b have been inserted. The pull exerted will cause the supplemental rake 2 to pivot about its hinge 6 and then move into an opened position as is shown in FIG. 2. The coil spring 7 has a certain function and that is to always bias the supplemental rake 2 into a closed or intertwined position with the main rake 1. This is accomplished by winding the coil spring into a tensioned state when the hinge 6 is assembled. Thereby, the one end 7a of the coil spring will abut against the movable part of the hinge 6 and the other end 7b of the coil spring 7 will abut against the stationary part of hinge 6. When, because of the movement of the slidable handle 13 and the other intervening elements the supplemental rake 2 moves away from the main rake 1, as is shown in FIG. 2, the coil spring 7 is further wound up or tensioned so that when slidable handle 13 bis released, the load that is now located between the main rake 1 and the supplemental rake 2 is automatically grasped by the two rakes without further intervention form the worker and can safely be deposited at its destination by simply pulling up on the slidable handle 13 again. When again no load is to be grasped, the supplemental rake 2 automatically returns to its intertwined position with the main rake because of the tensioned spring 7, as is shown in FIG. 1.

Turning now to FIGS. 4 and 5 wherein the same reference characters have been applied to the same elements as shown in FIGS. 1–3. The only difference in these Figs. can be seen in the activation of the swinging movement of the supplemental rake 2. To this end, the slidable handle 13 of FIGS. 1 and 2 has been replaced by a pivotal handle 14 which pivots around the pin 15 when activated. The wire or rod 12 is articulated around a pin 16 which is somewhat offset from the pivot pin 15. This kind of an arrangement exerts a more powerful influence on the supplemental rake 1 against the spring 7 because of an increased leverage on the pivotal handle 14.

FIGS. 6 and 7 show yet another arrangement for activating the supplemental rake into an open position. Again the same reference characters have been applied as they were found previously. In this embodiment, there is no coil spring in connection with the hinge as was shown in previous Figs. Instead, a compression spring 18 is provided close to the sliding handle 13. On the implement handle 3, a somewhat elongated housing 17 is located and within the housing the previously identified wire or rod 12 is slidingly arranged which has one end articulated around pin 8 on handle 13. On the wire or rod 12 a stop plate 19 is rigidly fastened behind which a pre-tensioned compression spring 18 is placed which tends to push the rod 12 forward and thereby the main rake 1 and the supplemental rake 2 in a closed position as is shown in FIG. 1. When the slidable handle 13 is pushed upwardly, that is, away from the front of the rake, the rod 12 is taken along together with the stop plate 19 whereby the spring 18 is being compressed against a wall of the housing 17 while at the same time, the supplemental rake, because of activating the V-shaped wire harness 10 which, as has been explained above, will turn the supplemental rake around its hinge by way of brackets 9 in which the ends of 10a and 10b of the wire harness 10 (only 10b can be seen in FIG. 6) are located. When grabbing a load of debris between the opened rakes, the force of the compression spring assures that the load is being maintained between the rakes by the compression spring 18 until the sliding handle 13 is pulled back again.

Turning now to FIGS. 8 and 9, there is shown a rake assembly having an increased load capacity. The same reference characters are used again on the same elements as were shown in previous Figs. In this embodiment instead of the supplemental rake tines 2 being directly attached to the hinge 6 in combination with the coil spring 7, whose ends 7a and 7b are shown in FIG. 8, an additional short plate 20 has been arranged on the movable part of the hinge 6 and at the other end of this plate 20, an additional hinge is fastened to which the tines of the supplemental rake 2 are attached. This is same structure of the hinge that is shown in FIGS. 1–3. Around the pintle of the hinge there is located another pretensioned coil spring 22 (only the ends 22a and 22b are shown in FIGS. 8 and 9). The plate 20 also carries two brackets 24, one on each end, into which again the ends 25 of the V-shaped wire harness 10 are articulated. There is a difference between the tension strengths of the two coil springs. The first coil spring located between the brackets 4 on the main rake 1 is somewhat weaker than the second coil spring 22 located between the brackets 24. In this manner, when the wire harness 10 is activated, plate 20 will swing away first from its rest position, as is shown in FIG. 8, to an extended position, as is shown in FIG. 9. Because of the addition of the plate 20, the load that can be grasped between the two rakes is greatly increased and is still held securely between the two rakes because of the presence of the two springs without any further intervention by the worker.

SUMMARY OF THE INVENTION

Because of the disclosure above, it can now be seen that a rake has been developed having a supplemental rake which normally is in a rest position when not in use and having its tines intertwined with the tines of the main rake but can readily be swung away from its rest position against the force of a spring by merely pulling on an activating handle which is slidably or pivotally arranged on the handle of the rake. This way, the rake is ready to be used as a debris pick-up implement when the activating handle is being released and the force of the spring comes now into play by pressing the supplemental rake against the load between the supplemental rake and the main rake without any further intervention by the worker. In order to deposit the load at the desired location, the worker has to merely pull back on the activating handle against the force of the spring, whereby the supplemental rake moves away from the load which is now free to be dropped. If a normal raking activity is to be resumed, the worker merely has to let go of the activating handle whereby the supplemental rake will again intertwine its tines with the main rake and assume a rest position, all because of the presence of the force of a spring or springs in the case of the embodiment wherein the capacity of the rake has been increased.

What I claim is:

1. A rake having a supplemental rake attached thereto for picking up loads of debris, said rake having a main rake and a supplemental rake, both of said main rake and said supplemental rake having tines thereon, said tines on both of said rakes have bent points thereon which oppose each other, said tines intertwine with each other when said supplemental rake is in a rest position, said supplemental rake is being hinged to said main rake by a hinge attached to said main rake including a stationary part of said hinge being mounted on said main rake, said hinge having a movable part having said tines of said supplemental rake mounted thereon, said part of said hinge having said tines mounted thereon being movable relative to said main rake, means for activating a movement of said supplemental rake away from said main rake, said means for activating is mounted on a handle to which said main rake is attached, said means for activating includes a wire rod which in turn is connected to a wire harness which in turn is articulated to at least one bracket mounted on said movable part of said hinge having said tines of said supplemental rake thereon, including a pretensioned spring in said means for activating which pretensioned spring always exerts its bias so that said supplemental rake is always forced into a rest position wherein said tines are intertwined with said tines on said main rake, said pretensioned spring is further tensioned when said activating means is activated to move said supplemental rake away from said main rake to grab a load there between and to hold the same there solely under the influence of said pretensioned spring.

2. The rake of claim 1 wherein said wire harness has the form of a V-shape and wherein both ends of said V-shape are articulated to two spaced apart brackets located on said movable part of said hinge.

3. The rake of claim 1, wherein said activating means mounted on said handle having said main rake thereon is a swinging lever pivotally mounted on said handle by way of a first pivot and is articulated to said wire rod.

4. The rake of claim 3, wherein said wire rod is articulated to said swinging lever by way of a second pivot which is offset from said first pivot.

5. The rake of claim 1, wherein said pretensioned spring is a coil spring in combination with said hinge, wherein one end of said coil spring abuts against said stationary plate and another end of said coil spring abuts against said movable part of said hinge.

6. The rake of claim 1, wherein said pretensioned spring is a compression spring located in a housing mounted on said handle having said main rake thereon, said wire rod passing through said housing and said compression spring including a stop plate on said wire rod onto which one end of said compression spring abuts, the other end of said compression spring abuts against a wall of said housing.

7. The rake of claim 1 including means for extending the load capacity of said rake.

8. The rake of claim 7, wherein said means for extending said load capacity includes an additional plate connected to said movable part of said hinge and said tines of said supplemental rake are attached to a movable part of another hinge on said plate including another pretensioned coil spring located in combination with said another hinge.

9. The rake of claim 8, wherein said hinge and said another hinge are pretensioned with different strengths.

10. The rake of claim 1, wherein said activating means mounted on said handle having said main rake thereon is a slidable handle which is slidable on said handle and is articulated to said wire rod.

* * * * *